United States Patent [19]

Tomikawa et al.

[11] Patent Number: 4,847,774
[45] Date of Patent: Jul. 11, 1989

[54] METHOD AND APPARATUS FOR DETECTING TRAVELING POSITION AND/OR DIRECTION OF AN UNMANNED VEHICLE

[75] Inventors: Hisao Tomikawa, Takatsuki; Mamoru Okazaki, Daito, both of Japan

[73] Assignee: Tsubakimoto Chain Co., Osaka, Japan

[21] Appl. No.: 907,368

[22] Filed: Sep. 12, 1986

[51] Int. Cl.$^4$ ............................................. G06F 15/50
[52] U.S. Cl. ................. 364/449; 364/424.02; 180/167; 180/169
[58] Field of Search ........... 364/443, 424, 449, 424.02; 318/587; 180/167, 168, 169

[56] References Cited

U.S. PATENT DOCUMENTS

| | | | |
|---|---|---|---|
| 4,437,533 | 3/1984 | Bierkarre et al. | 180/168 |
| 4,541,049 | 9/1985 | Alibom | 364/424 |
| 4,566,032 | 1/1986 | Hirooka et al. | 358/103 |
| 4,588,041 | 5/1986 | Tsuchihashi | 180/168 |
| 4,593,239 | 6/1986 | Yamamoto | 180/167 X |
| 4,613,804 | 9/1986 | Swenson | 318/587 |
| 4,658,928 | 4/1987 | Seo | 180/168 |
| 4,665,487 | 5/1987 | Ogawa et al. | 364/424 |

Primary Examiner—Gary Chin
Assistant Examiner—Thomas G. Black
Attorney, Agent, or Firm—Darby & Darby

[57] ABSTRACT

A method and apparatus for detecting the traveling position and direction of an unmanned vehicle of an autonomous guidance system, wherein pairs of marks are provided along a course on which the unmanned vehicle is to travel and disposed perpendicularly to the course respectively, and at the unmanned vehicle are provided sensors which can detect the marks and specify the relative positions of the marks with reference to the traverse direction of the vehicle body, thereby obtaining the traveling position and/or direction of the vehicle by the relative positions of each pair of marks and a time difference between the time points when either of the marks and another mark being detected respectively or a travel distance between the time points in time. Hence, the traveling position and direction can be accurately and rapidly detected and a shift of the vehicle from the guide course can be quickly eliminated.

18 Claims, 5 Drawing Sheets

METHOD AND APPARATUS FOR DETECTING TRAVELING POSITION AND/OR DIRECTION OF AN UNMANNED VEHICLE

BACKGROUND OF THE INVENTION

1. Field of the Invention

This invention relates to a method and apparatus in practical use, thereof, for detecting the traveling position and/or direction of an unmanned vehicle traveling by means of an autonomous guidance system.

2. Description of the Prior Art

An unmanned vehicle automatically travelling on a plant floor without using a railed track has recently been developed and put into practical use. The well-known method for controlling the travel of the unmanned vehicle, utilizes as the guiding information an electromagnetic wave generated by a current flowing in a wire provided under the floor. Such controlling method, however, needs great expense for the wire burying work and is difficult to carry out maintenance and inspection and moreover not easy to change the course on which the vehicle travels. There is an autonomous guidance method as a countermeasure for the above defects, which mounts on the vehicle an arithmetic unit which accumulates and computes pulses corresponding to the number of rotations of right and left wheels, the vehicle being set at a start point on the course on which the vehicle is to travel, sequentially counting the pulse number simultaneously with a start of the vehicle, detecting the position and direction of the vehicle, and guiding the vehicle to travel accurately along the predetermined course, thereby correcting at the fixed points on the way of the course the position and direction of the vehicle to eliminate the cumulative errors.

The method for controlling the travel of unmanned vehicle by use of the aforesaid autonomous guidance method is that intensities of magnetic fields of magnets disposed at the fixed points on the travel course for the vehicle are detected by a plurality of magnetism detection elements being disposed in the transverse direction of the vehicle, and the travelling position and/or direction of the same when passing the fixed points are computed separately on the basis of an output of each magnetism detection element, thereby correcting the detected traveling position and/or direction in accordance with the computed values (the Japanese Patent Laid-Open No. 58-11030).

The above conventional method, however, disposes each magnet at each fixed point spaced at a predetermined interval along the traveling course, whereby the traveling position and/or direction cannot be detected until the vehicle having passed on the two magnets. Hence, a time delay occurs, thereby creating the problem in that the non-linear travel of the vehicle within the time-delay causes an error.

SUMMARY OF THE INVENTION

In the light of the above-mentioned problem, the present invention has been designed. A first object thereof is to provide a method and apparatus for detecting the traveling position and/or direction of a vehicle, which dispose a pair or pairs of marks at the fixed points in the direction of intersecting the guiding direction of the travel course and provide the unmanned vehicle with sensors each detecting the transversely relative position of the mark to the vehicle, so that each sensor detects, the marks, thereby enabling the traveling position and/or direction of the vehicle to be instantaneously detected and mixing of error to be considerably reduced.

A second object of the present invention is to provide a method and apparatus which simply and rapidly compute the traveling position and/or direction of the vehicle.

The above and further objects and features of the invention will more fully be apparent from the following detailed description with accompanying drawings.

DETAILED DESCRIPTION OF THE INVENTION

Figure 1:
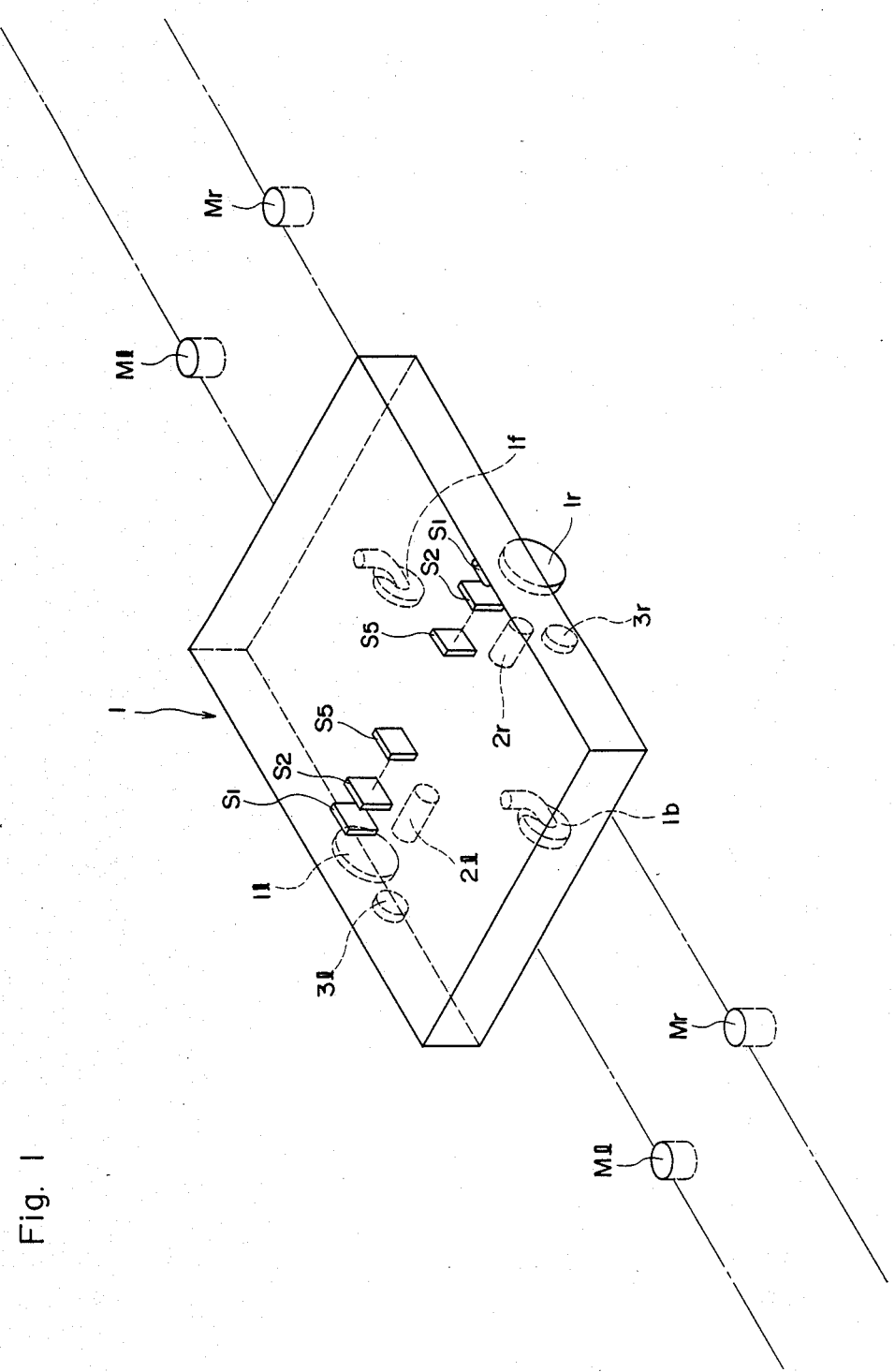
FIG. 1 is a schematic view of an embodiment of an unmanned vehicle of the invention and marks thereof.

Next, the present invention will concretely be described in accordance with the drawing showing an embodiment of the invention. In addition, in the following embodiment, magnets are used as the marks and magnetic sensor are used as the sensors, or alternatively different kinds of marks and sensors, for example, optical marks and optical sensors may be used.

Figure 4:
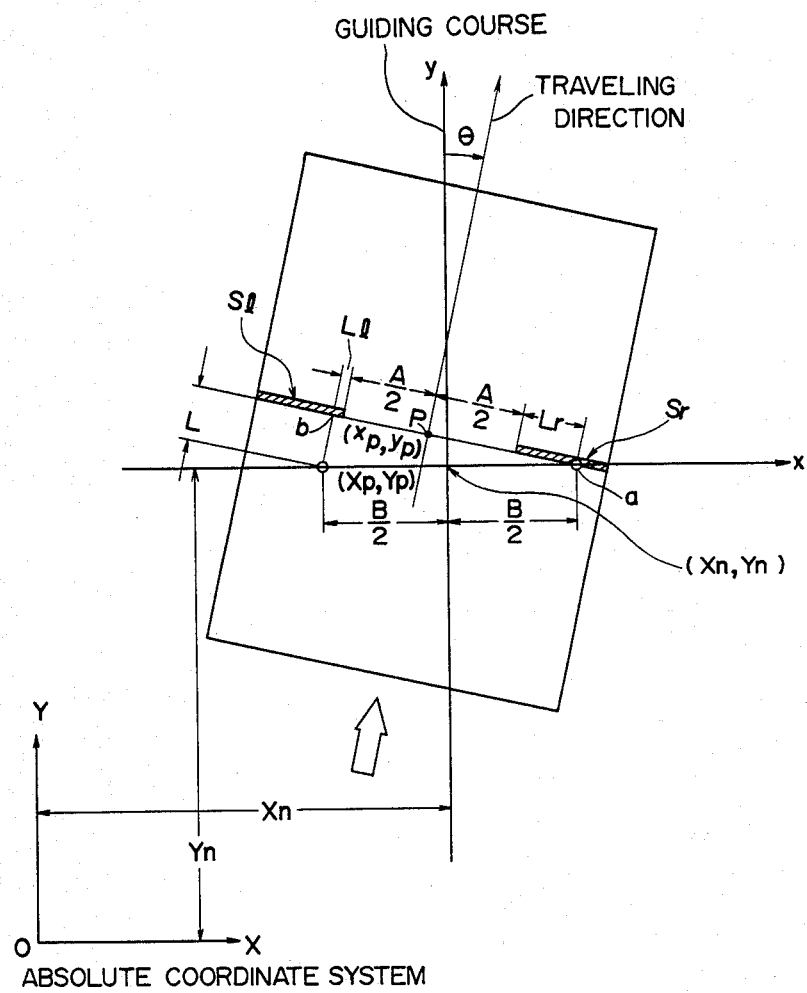
FIG. 4 is a view explanatory of a method, for computing the traveling position and/or direction of the unmanned vehicle.

FIG. 1 is a schematic view exemplary of the relation between the magnets as the marks disposed at the fixed points on the course on which the unmanned vehicle of the invention is to travel and the magnetic sensors provided at the vehicle, in which reference letter F designates a floor, Ml and Mr designate permanent magnets, and reference numeral 1 designates the unmanned vehicle (hereinafter to be called only the vehicle), the magnets Ml and Mr each comprising a cylindrical permanent magnet (or electromagnets may also be used) and being disposed at one end face to be level with the floor surface. Also, a pair or pairs of the magnets Ml and Mr are disposed at each fixed points of the already-known coordinate with respect to the origin O of the absolute coordinate system X-Y and perpendicularly to the traveling direction of the vehicle on the course and spaced at the predetermined interval B(or B/2 with respect to the center line of the course). The vehicle 1 is provided at the longitudinally central portion thereof with driving wheels 1l and 1r controllable independently by separate motors 2l and 2r and at the transversely central portions of front and rear of the vehicle with casters 1f and 1b respectively. The numbers of rotations of the driving wheels 1l and 1r are detected by counting the pulses from pulse generators 3l and 3r attached to the driving wheels 1l and 1r respectively, the traveling position and/or direction of the vehicle 1 are sequentially computed, and both the driving wheels 1l and 1r are adapted to be rotatably driven relative by to each other so that the vehicle 1 travels along the course decided by the travel schedule. The vehicle 1 is provided at the longitudinally central portion of the lower wall and at both the lateral sides with a plurality (in the embodiment, five at one lateral side) of hall elements $S_1, S_2 ... S_5$ as the magnetism detection elements which are disposed being spaced at the predetermined intervals in the transverse direction, in other words, in the direction of width, perpendicular to the traveling direction of the vehicle, thereby forming a pair of magnetic sensors Sl and Sr, the inner ends of both the magnetic sensors Sl and Sr being spaced by A/2 respectively from the center line of width as shown in FIG. 4.

Figure 2:
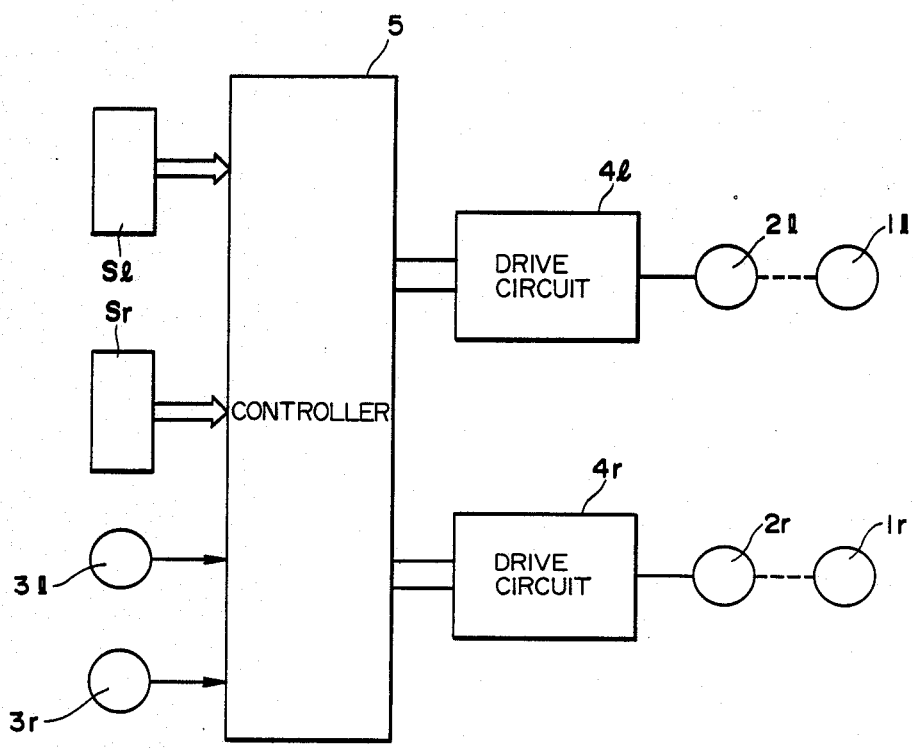
FIG. 2 is a block diagram of a steering control system of the unmanned vehicle, FIGS. 3-(a) and -(b) are views explanatory of the relation between the magnets and the hall elements at magnetic sensors.

FIG. 2 shows a steering control system of the vehicle 1, in which the outputs from the magnetic sensors Sl, Sr and pulse generators 3l, 3r are introduced into a controller 5, where the outputs of magnetic sensors Sl and Sr are introduced therein through an analog/digital converter (not shown). The controller 5 detects the traveling position and/or direction of the vehicle 1 on the basis of the aforesaid outputs and the initial position of the same set by the aforesaid absolute coordinate system X-Y, and outputs the required signal to drive circuits 4l and 4r for the motors 2l and 2r to thereby steer the vehicle 1 to travel along the course decided by the steering schedule, or stops the vehicle 1.

Next, explanation will be given on detection of the traveling position and/or direction of the vehicle, which is the gist of the present invention.

Generally, the hall element has the property such that in a case where a current flows in the hall element in the constant direction, when the magnetic field acts on the same perpendicularly to the current direction, an electromotive force corresponding to the intensity of magnetic field and perpendicular to both the current flowing direction and the direction of magnetic field is generated. Accordingly, it is possible to detect the intensity of magnetic field and the direction of line of magnetic force by detecting magnitude and polarity of generated voltage.

Figure 3A:
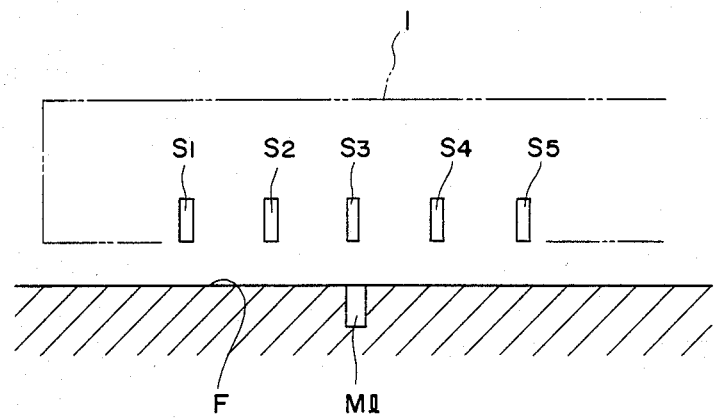
Figure 3B:
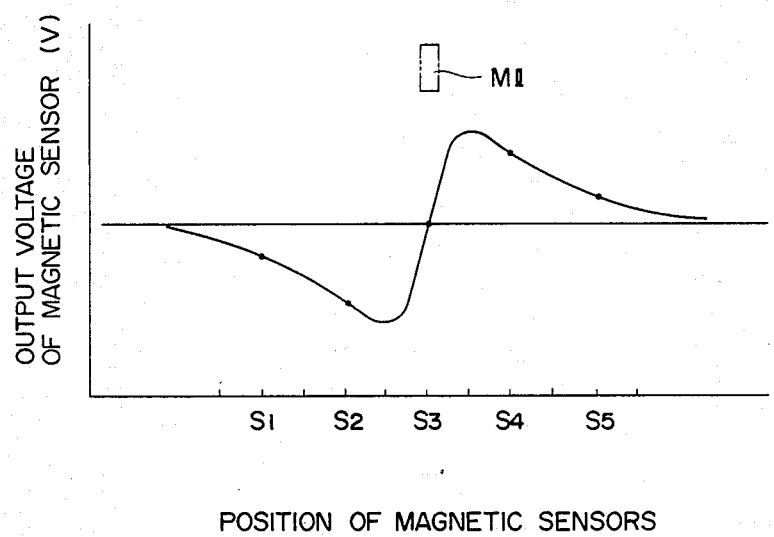

FIG. 3-(a) is a schematic view showing the relation of position between the hall elements $S_1$ to $S_5$ constituting the magnetic sensor Sl at one side of the vehicle 1 and the magnet Ml, FIG. 3-(b) is a graph showing output voltage of the respective hall elements to $S_1$ to $S_5$. As shown in FIG. 3-(a), at the instant that the central hall element $S_3$ among the hall elements $S_1$ to $S_5$ constituting the left side magnetic sensor Sl passes just above the magnet Ml, the hall elements $S_1$ to $S_5$ are positioned in the magnetic field of magnet Ml and subjected to the rightward or leftward magnetic force corresponding to the distance of the respective hall elements $S_1$ to $S_5$ from the magnet Ml. As a result, the output voltage of the respective hall elements $S_3$ to $S_5$ as shown in FIG. 3-(b) develops the maximum value at the hall element $S_4$ and decreases toward the hall element $S_5$ and the output voltage of the respective hall elements $S_1$ to $S_3$ indicates at the hall elements $S_2$ the maximum value reverse to that of hall element $S_4$, and then decreases toward the hall element $S_1$. Hence, the hall element opposite to the magnet Ml is specified, and the magnet Mr is identified with the above. The controller 5 periodically reads the output from the magnetic sensors Sl and Sr, so that at the time when any hall element has the maximum voltage value, the hall element opposite to or close to the magnet Ml or Mr is specified by use of the relation between the output voltages of magnetic sensors and the positions thereof as shown in FIG. 3. Thus, the widthwise position of the vehicle 1 opposite to the magnetic Ml and Mr is detectable, whereby the controller 5 detects the traveling position and/or direction of the vehicle 1 by the following algorithm on the basis of the detected position of the vehicle.

FIG. 4 is an illustration of a method for obtaining the traveling position and/or direction of the vehicle 1 from the relation between the magnetic sensors Sl, Sr on the vehicle 1 and the magnets Ml, Mr, in which the magnetic sensors Sl and Sr at both lateral sides of the vehicle 1 traveling in the direction of the unshaded arrow reach the fixed points, the magnetic sensor Sl has passed above the magnetic Ml, and magnetic sensor Sr reaches above the magnet Mr. When an intersection of the magnetic sensor Sr with the magnet Mr is represented by a, a distance Lr from the point a to the inner end of magnetic sensor Sr is obtained from the aforesaid specified hall element. A distance Ll between the position at the sensor Sl opposite to the magnet Ml (designated by b) above which the magnetic sensor Sl having passed and the inner end of magnetic sensor Ll, is similarly obtainable. Also, during the time difference between the time when the magnetic sensors Ll and Sr passes above the magnets Ml and Mr respectively, the number of pulses generated by the pulse generator 3l attached to the left side wheel 1l is counted and multiplied by a predetermined conversion coefficient, thereby obtaining a distance L between the point b and the magnet Ml.

Here, when an angle between the course on which said unmanned vehicle is to travel of the vehicle 1 and the traveling direction thereof is represented by $\theta$, the coordinates of the middle point of the line connecting both the magnets Ml and Mr at the aforesaid absolute coordinate system are represented by (Xn, Yn), the coordinate point (Xn, Yn) is taken as the origin, the axis X is taken in the direction of passing both the magnets Ml and Mr and the axis Y is taken in the steering direction of the vehicle 1, and the coordinates of the center P of the vehicle 1 at the coordinate system X-Y are represented by (xp, yp), the coordinates (Xp, Yp) of the center P of the vehicle 1 in the absolute coordinate system are given in the following equations:

$$Xp = xp + Xn \qquad (1)$$

$$Yp = yp + Yn \qquad (2)$$

xp, yp in the equations (1) and (2) are given in the following equations:

$$xp = \frac{B}{2} - \left(Lr + \frac{A}{2}\right)\cos\theta \qquad (3)$$

$$= \frac{B}{2} - \left(Lr + \frac{A}{2}\right) \cdot \left(\frac{Ll + Lr + A}{B}\right)$$

$$yp = \left(Lr + \frac{A}{2}\right)\sin\theta = \left(Lr + \frac{A}{2}\right)\frac{L}{B} \qquad (4)$$

The angle $\theta$ between the center line of the travel course and the traveling direction of the vehicle 1, in other words, an azimuth angle $\theta$ in the travel thereof, is given in the follow equation:

$$\theta = \sin^{-1}\frac{L}{B} = \cos^{-1}\left(\frac{Ll + Lr + A}{B}\right) \quad (5)$$

Figure 5:
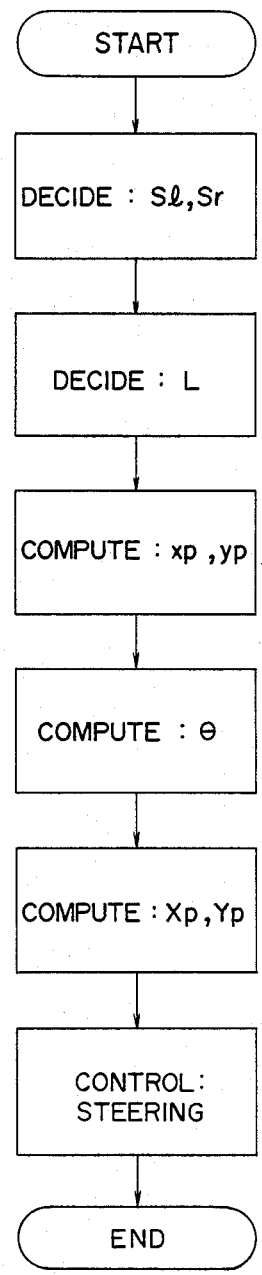
FIG. 5 is a flow chart of computation of the traveling position and/or direction and of steering control of the same.

Therefore, the coordinates of the center at the vehicle 1 in the absolute coordinate system, in other words, the traveling position of the vehicle, is obtained by substituting into the equations (1) and (2) the coordinates (Xn, Yn) preset in the controller 5 and the equations (3), (4) and (5). In order to coincide the traveling position (Xp, Yp) and azimuth angel 0 computed as above-mentioned with the travel schedule preset in the controller 5, the controller 5 sends separate signals to drive circuits 4l and 4r respectively, thereby steering the vehicle 1. FIG. 5 is a flow chart of a series of computation and steering control as above-mentioned.

In the method of the present invention, when the vehicle 1 passes above the magnets Ml and Mr at the fixed points, the magnetic sensors Sl and Sr specify the widthwise position of the vehicle 1 opposite to the magnets Ml and Mr, whereby the aforesaid distance Ll, Lr and L are instantaneously obtainable on the basis of the detected position of the vehicle 1. Also, the computation is carried out by use of Ll, Lr and L, thereby enabling the traveling position and/or direction of the vehicle 1 in the absolute coordinate system X-Y to be obtained for a short time. Hence, the drive control (or brake control) for the right and left wheels 1l and 1r can correct the travel of vehicle 1 along the travel course.

Especially, the magnets conventionally have been disposed on the travel course longitudinally in the travelling direction at the predetermined intervals, whereby the traveling position and/or direction cannot be detected until the vehicle 1 passes through an interval between both the magnets. While, the method of the present invention disposes the magnets Ml and Mr in parallel to each other and perpendicularly to the traveling direction of the vehicle on the course, and the magnetic sensors Sl and Sr also are disposed at the longitudinally central portions and near both lateral sides of the vehicle 1, so that when the vehicle 1 travels just along the travel course, the relative position of the vehicle 1 and the magnets Ml and Mr are detectable instantaneously, or in an extremely short time even the travelling direction of the vehicle 1 somewhat biased to the travel course. As a result, the mixing of error less occurs to enable accurate correction of the traveling position and/or direction of the vehicle 1.

Alternatively, the magnetic sensors Sl and Sr may be disposed, for example, widthwise of the vehicle; at the front end, the rear end, or a longitudinally intermediate portion of the vehicle 1. Also the magnetic sensors Sl and Sr may of course be disposed longitudinally of the vehicle 1 somewhat near to the front end or to the rear end.

Alteratively, one magnetic sensor instead of two magnetic sensors Sl and Sr may be disposed in a line through the entire width of the vehicle 1.

Especially, when the marks of magnets or the like, as shown in the aforesaid embodiment, are coincident in the arrangement direction with the coordinate axes of the absolute coordinate system, or the sensors are disposed in the onedimensionally extending direction perpendicular to the vehicle, the operational expression becomes simple.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method for detecting the traveling position and-/or direction of an unmanned vehicle traveling by an autonomous guidance system, on the basis of the results of detecting marks disposed along a course on which said unmanned vehicle is to travel, said method comprising the steps of: disposing a pair or pairs of marks in a direction intersecting the course on which said unmanned vehicle is to travel, providing said unmanned vehicle with sensors for detecting said marks in order to obtain information for specifying the relative positions of said marks with respect to the transverse direction of the vehicle body, and computing said traveling position and/or direction from detection results based on said sensors with respect to a two dimensional rectangular coordinate system, one axis of the coordinate system being coincident with the disposed direction of the marks, the other being coincident with course on which the vehicle is to travel.

2. A method for detecting the traveling position and-/or direction of an unmanned vehicle according to claim 1, wherein said marks are disposed perpendicularly to said course on which said unmanned vehicle is to travel.

3. An apparatus for detecting the traveling position and/or direction of an unmanned vehicle traveling by means of an autonomous guidance system, on the basis of the results of detecting marks disposed along a course on which said unmanned vehicle is to travel, said apparatus comprising:

a pair or pairs of marks being disposed in a direction intersecting said course on which said unmanned vehicle is to travel;

sensors, being disposed on the bottom of said unmanned vehicle and arranged in the transverse direction of the vehicle, which detect said marks for obtaining information specifying the relative position of said marks with reference to the transverse direction of said vehicle; detection means for detecting a vehicle body travel distance between time points where either of the marks and another mark are detected by said sensors respectively: said marks and detection means being equipped at said unmanned vehicle; and computing means for computing traveling position and/or direction of said unmanned vehicle on the vasis of said relative position specifying information and said travel distance of said vehicle body with respect to a two dimensional rectangular coordinate system, one axis of the coordinate system being coincident with the disposed direction of the marks, the other being coincident with the course on which the vehicle is to travel.

4. An apparatus for detecting the traveling position and/or direction of an unmanned vehicle according to claim 3 wherein said marks are disposed perpendicularly to said course on which said unmanned vehicle is to travel.

5. An apparatus for detecting the traveling position and/or direction of an unmanned vehicle according to claim 4, wherein said marks are magnets respectively.

6. An apparatus for detecting the traveling position and/or direction of an unmanned vehicle according to claim 4, wherein said marks are optical marks respectively.

7. An apparatus for detecting the traveling position and/or direction of said unmanned vehicle according to claim 3, wherein said sensors are disposed in a line in a one-dimensional manner and perpendicularly to the traveling direction of said unmanned vehicle.

8. An apparatus for detecting the traveling position and/or direction of an unmanned vehicle according to claim 7, wherein said sensors comprise a plurality of magnetic elements being disposed in the transverse direction of the vehicle body.

9. An apparatus for detecting the traveling position and/or direction of an unmanned vehicle according to claim 8, wherein said sensors are separated right and left of said vehicle body.

10. An apparatus for detecting the traveling position and/or direction of an unmanned vehicle according to claim 7, wherein said sensors comprise a plurality of photosensors being disposed in the transverse direction of said vehicle body.

11. An apparatus for detecting the traveling position and/or direction of an unmanned vehicle according to claim 10, wherein said sensors are separated right and left of said vehicle body.

12. An apparatus for detecting the traveling position and/or direction of an unmanned vehicle according to claim 3, wherein said computing means specifies said course on which said unmanned vehicle is to travel and said marks or use of a two-dimensional coordinate system.

13. An apparatus for detecting the traveling position and/or direction of an unmanned vehicle according to claim 3, wherein said marks are magnets respectively.

14. An apparatus for detecting the traveling position and/or direction of an unmanned vehicle according to claim 3, wherein said sensors comprise a plurality of magnet sensitive elements being disposed in the transverse direction of the vehicle body respectively.

15. An apparatus for detecting the traveling position and/or direction of an unmanned vehicle according to claim 14, wherein said sensors are separated right and left of said vehicle body.

16. An apparatus for detecting the traveling position and/or direction of an unmanned vehicle according to claim 3, wherein said marks are optical marks respectively.

17. An apparatus for detecting the traveling position and/or direction of an unmanned vehicle according to claim 3, wherein said sensors comprise a plurality of optical sensors being disposed in the transverse direction of said vehicle body.

18. An apparatus for detecting the traveling position and/or direction of an unmanned vehicle according to claim 17, wherein said sensors are separated right and left of said vehicle body.

* * * * *